US010349097B2

(12) United States Patent
Reck et al.

(10) Patent No.: US 10,349,097 B2
(45) Date of Patent: Jul. 9, 2019

(54) METADATA EDITOR FOR MULTIMEDIA DELIVERY

(71) Applicant: MTI Film, LLC, Providence, RI (US)

(72) Inventors: Randall Reck, Manhattan Beach, CA (US); Peter John Firth, Dartmouth, MA (US); Larry Elec Chernoff, Beverly Hills, CA (US)

(73) Assignee: MTI Film, LLC, Providence, RI (US)

( * ) Notice: Subject to any disclaimer, the term of this patent is extended or adjusted under 35 U.S.C. 154(b) by 69 days.

(21) Appl. No.: 15/796,127

(22) Filed: Oct. 27, 2017

(65) Prior Publication Data
US 2019/0132618 A1    May 2, 2019

(51) Int. Cl.
  *G06F 16/738*   (2019.01)
  *G11B 27/028*   (2006.01)
  *H04N 21/235*   (2011.01)
  *H04N 21/472*   (2011.01)

(52) U.S. Cl.
CPC ....... *H04N 21/2353* (2013.01); *G06F 16/739* (2019.01); *G11B 27/028* (2013.01); *H04N 21/47205* (2013.01)

(58) Field of Classification Search
CPC . G06F 16/739; G11B 27/028; H04N 21/2353; H04N 21/47205
See application file for complete search history.

(56) References Cited

U.S. PATENT DOCUMENTS

| 8,655,885 B1 | 2/2014 | Scott et al. |
| 2002/0035732 A1 | 3/2002 | Zetts |
| 2007/0044010 A1 | 2/2007 | Sull et al. |
| 2016/0300596 A1* | 10/2016 | Ransdell ............. G11B 27/323 |

OTHER PUBLICATIONS

Israel Patent Office, International Search Report and Written Opinion for PCT/US2018/055647, dated Feb. 10, 2019, 6 pages.
"Mastering High Dynamic Range Content Using Dolby Vision", https://knowledge.autodesk.com/support/flame-products/learn-explore/caas/CloudHelp/cloudhelp/2017/ENU/Lustre/files/GUID-F481488F-4F01-42FA-8620-103F2D5A121E-htm.html, dated Nov. 7, 2016.

* cited by examiner

*Primary Examiner* — Huy T Nguyen
(74) *Attorney, Agent, or Firm* — Sunstein Kann Murphy & Timbers LLP

(57) ABSTRACT

A metadata editor processes the metadata track of a multimedia composition to synchronize the metadata track with a video track and identify any errors in the metadata track internally or relative to the video track. The metadata editor effectively divides the metadata track into segments, displays breaks on the video and metadata tracks to show the metadata segments relative to the video track, characterizes each segment as being either erroneous (e.g., warranting attention by the user) or consistent (e.g., not warranting attention by the user), and highlights erroneous metadata segments, e.g., by displaying erroneous metadata segments using a different color, pattern, or other visual indicator than consistent metadata segments. The metadata editor provides various mechanisms to allow the user to manipulate the metadata track in order to correct erroneous metadata segments.

22 Claims, 12 Drawing Sheets
(10 of 12 Drawing Sheet(s) Filed in Color)

METADATA EDITOR FOR MULTIMEDIA DELIVERY

FIELD OF THE INVENTION

The present invention relates generally to a metadata editor for multimedia delivery such as for high dynamic range multimedia compositions.

BACKGROUND OF THE INVENTION

Multimedia compositions, such as motion pictures, are often distributed in the form of digital multimedia files that contain video, audio, and related metadata content. Multimedia compositions often require multiple different versions in order to support multiple market segments, such as, for example, an airline version, a video-on-demand version, a cable or satellite television version, a DVD version, an OTT version, a promotional version, etc. Such multimedia compositions often include one or more video tracks, one or more audio tracks, and one or more metadata tracks. Depending on the type of multimedia composition, the metadata can include such things as subtitles, captioning, cropping instructions, color adjustments, dynamic range adjustments, or other information. Rather than creating multiple "master" copies of the multimedia composition, the multimedia composition can include sufficient video, audio, and metadata information to specify multiple versions.

One area where such multimedia compositions are used is in the delivery and manipulation of high dynamic range (HDR) content. Frequently, professional digital motion picture cameras are equipped to capture HDR images. For professional use, a few display devices, such as the Dolby Professional Reference Monitor, are capable of displaying HDR imagery. There is a growing list of consumer monitors that are HDR capable, including those manufactured by LG, Sony, Samsung, and others; however, most other display devices in existence are only capable of displaying Standard Dynamic Range (SDR) imagery.

Image manipulation, known as tone mapping, is applied to HDR material to reduce the dynamic range and make it suitable for display on SDR display equipment. The exact nature of the tone mapping manipulation is a creative decision that can be made on a shot-by-shot, or even frame-by-frame, basis. Separate tone mapping decisions may be created for different display devices. Each tone mapping decision is typically approved by the owners of the content or their agents to ensure fidelity to the artistic intent of the material.

There are a number of multimedia delivery formats in use or proposed that support HDR and related content.

Dolby Vision™ is a delivery format for organizing image media and sound media along with metadata such as tone mapping decisions. Dolby Vision is described in a white paper published by Dolby Laboratories available at https://www.dolby.com/us/en/technologies/dolby-vision/dolby-vision-white-paper.pdf on or before Sep. 28, 2017, the content of which are hereby incorporated by references in its entirety. While Dolby Vision was motivated by the desire to deliver HDR images along with approved tone mapping metadata, other types of metadata are also supported, including image cropping instructions, audio closed captioning, source timecodes, and other metadata. Systems, such as FLAME™ by Autodesk Inc., allow a user to perform a mastering processing by which an HDR graded reference is optimized to make the best use of the capacities of lower dynamic range displays. The mastering process generates an XML metadata file that is included along with the original HDR reference media as part of the Dolby Vision delivery package. A Dolby Vision compliant device is capable of accessing the image and sound media contained in the delivery package and applying the necessary metadata to properly display the material.

HDR10 is another HDR delivery format in common use. Like Dolby Vision, HDR10 includes a metadata track. Unlike Dolby Vision, HDR10 is considered a static system in that the metadata establishes picture settings at the beginning of the composition that remain constant throughout. An extended version of HDR10 referred to as HDR10+ has been proposed.

Hybrid-Log Gamma (HLG) is another HDR delivery format that is used primarily in broadcast (e.g., cable and satellite) delivery. HLG presents a single stream of content data that displays properly in both HDR and SDR monitors.

Technicolor HDR is yet another HDR delivery format this is used primarily in Europe.

Interoperable Master Format (IMF) is another multimedia delivery format that is specified by industry organization SMPTE (Society of Motion Picture and Television Engineers). As described on the Interoperable Master Format Forum website (www.imfforum.com), IMF is an international standard for the file-based interchange of multi-version, finished audio-visual works. It supports multi-language, multi-reel, subtitles/closed captions, video inserts and after-the-fact delivery of content with "supplemental packages." IMF is built around a core framework (SMPTE ST 2067-2) that includes essence containers, audio and timed text essence formats, basic descriptive metadata, complex playlists, delivery, etc. This core framework is supplemented by incremental constraints ("applications") specific to particular domains. A typical application will specify video codecs and image characteristics, and can specify additional descriptive metadata, for instance.

SUMMARY OF EXEMPLARY EMBODIMENTS

In accordance with one embodiment of the invention, a computer program product comprises a tangible, non-transitory computer-readable medium having embodied therein a computer program for editing metadata for a multimedia composition having a video track and a metadata track, which, when run on a computer, causes the computer to perform computer processes comprising processing the metadata track to synchronize the metadata track with the video track and to logically divide the metadata track into a succession of metadata segments, wherein each metadata segment is characterized as one of (a) a consistent metadata segment or (b) an erroneous metadata segment; and displaying, on a computer display device, a graphical user interface display screen including a representation of a portion of the metadata track including (a) a set of the metadata segments associated with the portion of the metadata track and (b) a break between each pair of adjacent metadata segments, wherein a set of erroneous metadata segments is visually distinguished from a set of consistent metadata segments of the set of metadata segments, and wherein the displayed metadata segments and breaks are active elements that allow for user manipulation of the portion of the metadata track via the graphical user interface display screen to correct the set of erroneous metadata segments.

In accordance with another embodiment of the invention, a computer-implemented method for editing metadata for a multimedia composition having a video track and a metadata track, the method comprising processing the metadata track to synchronize the metadata track with the video track and to logically divide the metadata track into a succession of metadata segments, wherein each metadata segment is characterized as one of (a) a consistent metadata segment or (b) an erroneous metadata segment; and displaying, on a computer display device, a graphical user interface display screen including a representation of a portion of the metadata track including (a) a set of the metadata segments associated with the portion of the metadata track and (b) a break between each pair of adjacent metadata segments, wherein a set of erroneous metadata segments is visually distinguished from a set of consistent metadata segments of the set of metadata segments, and wherein the displayed metadata segments and breaks are active elements that allow for user manipulation of the portion of the metadata track via the graphical user interface display screen to correct the set of erroneous metadata segments.

In various alternative embodiments, the set of consistent metadata segments may be displayed using a first visual indicator and the set of erroneous metadata segments may be displayed using at least one visual indicator different than the first color. Visual indicators may include colors, patterns (e.g., hatching), or other visual indicators. Different visual indicators may be used to represent different types of erroneous metadata segments.

Additionally or alternatively, the graphical user interface display screen may allow the user to delete, replace, or accept an erroneous metadata segment. For example, the graphical user interface display screen may allow the user to replace an erroneous metadata segment by logically copying metadata from another metadata segment and logically pasting the copied metadata to the erroneous metadata segment, by logically extending an adjacent metadata segment over the erroneous metadata segment (e.g., by dragging a break associated with the adjacent metadata segment), or by dragging an adjacent metadata segment to the erroneous metadata segment.

Additionally or alternatively, the graphical user interface display screen may allow the user to change the duration of a selected metadata segment (e.g., by dragging a break associated with the selected metadata segment).

Additional embodiments may be disclosed and claimed.

BRIEF DESCRIPTION OF THE DRAWINGS

The patent or application file contains at least one drawing executed in color. Copies of this patent with color drawing(s) will be provided by the Patent and Trademark Office upon request and payment of necessary fee.

The foregoing features of embodiments will be more readily understood by reference to the following detailed description, taken with reference to the accompanying drawings, in which:

FIG. 6 is a screenshot showing an updated view of the screen of FIG. 5, showing representations of the video and metadata tracks at a finer granularity.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Definitions. As used in this description and the accompanying claims, the following terms shall have the meanings indicated, unless the context otherwise requires:

A "set" includes at least one member.

A "portion" of a metadata track, metadata segment, or composition includes some or all of the metadata track, metadata segment, or composition.

Editing systems have existed to manipulate sequences of digital images and sequences of digital audio. These systems can be used to rearrange picture tracks and audio tracks on a shot-by-shot basis to generate deliverable content. MTI Film has invented a metadata editing system (referred to herein as the "metadata editor") that encompasses the metadata realm in high dynamic range (HDR) systems. Among other things, the metadata editor can rearrange picture tracks, audio tracks, and metadata tracks to generate deliverable content with coherent metadata information. As such, the metadata editor provides a technological solution to a problem that arises solely in the realm of technology and specifically in the technology of HDR multimedia delivery.

Figure 1:
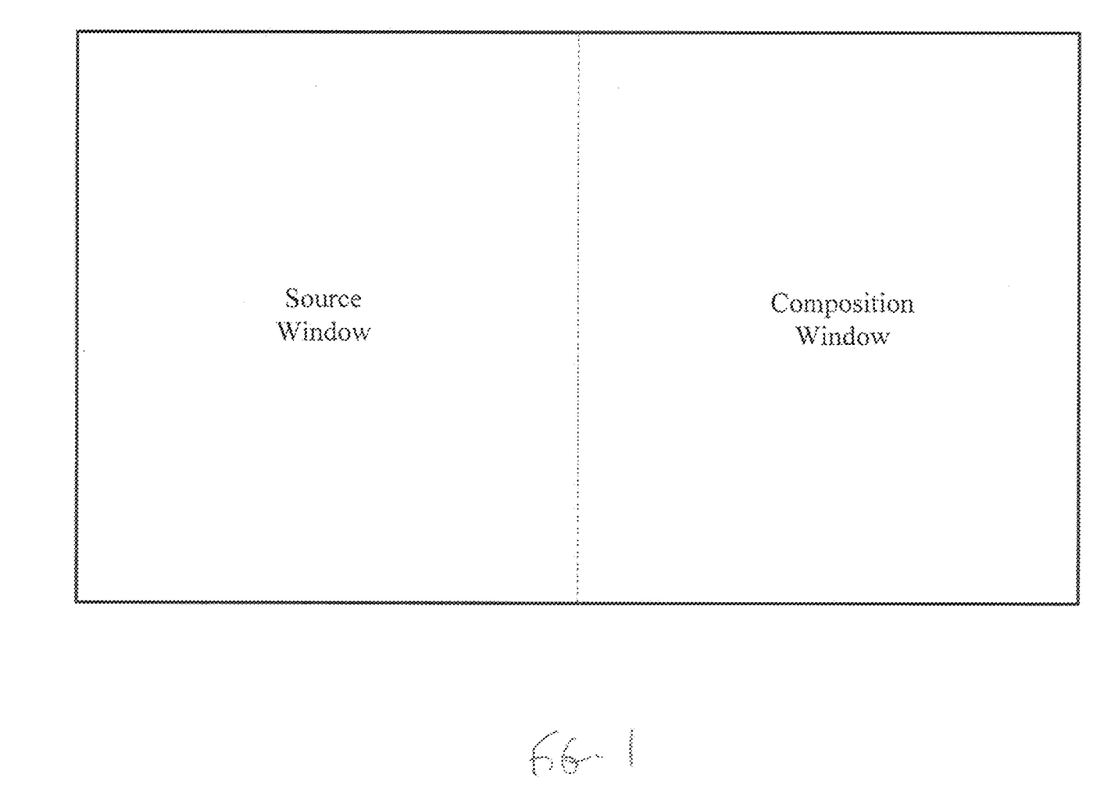
FIG. 1 is a schematic diagram showing the nominal layout of a metadata editor graphical user interface (GUI) screen displayed by the metadata editor on a computer display device, in accordance with one exemplary embodiment.
Figure 2:
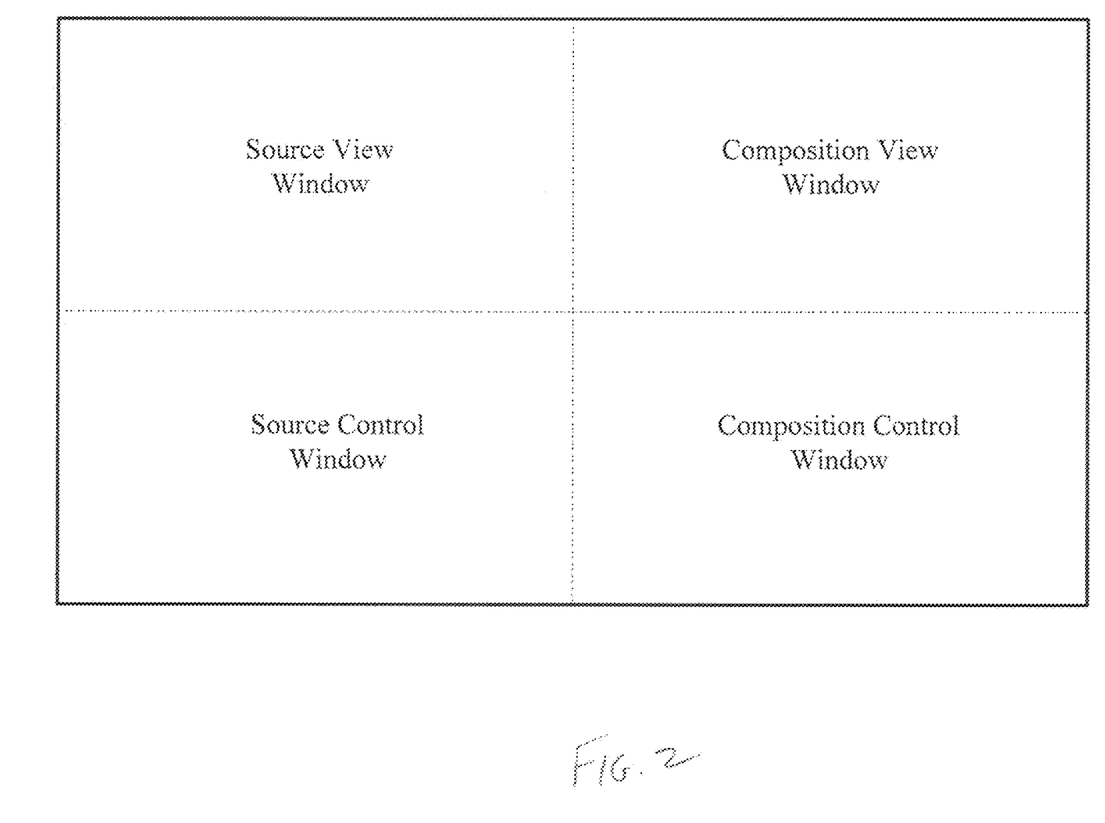
FIG. 2 is a schematic diagram showing the source window and the composition window of FIG. 1 logically divided into a view window and a control window, in accordance with one exemplary embodiment.

FIG. 1 is a schematic diagram showing the nominal layout of a metadata editor graphical user interface (GUI) screen displayed by the metadata editor on a computer display device, in accordance with one exemplary embodiment. Here, the screen is logically divided into a source window and a composition window. The source window allows for manipulation of source files, such as video files, audio files, and metadata files. The composition window allows for manipulation of a composition that incorporates multiple source files, such as, for example, a video file, one or more audio files, and a metadata file. In certain embodiments, up to 16 audio files can be associated with a composition (e.g., six audio files may be included for 5.1 channel audio, while eight audio files may be included for 7.1 channel audio). In one exemplary embodiment, the source window and the composition window are logically divided into a view window and a control window, as shown schematically in FIG. 2.

A composition can be created by adding video, audio, and metadata tracks to the composition and inserting source files into the tracks. For example, a composition may be created by adding a video track and a metadata track to the composition and respectively inserting video and metadata files into the tracks. Various exemplary embodiments are described herein with reference to screenshots taken from a prototype implementation. For convenience, portions of the screenshots containing copyrighted or otherwise protected images have been obscured.

Figure 3:
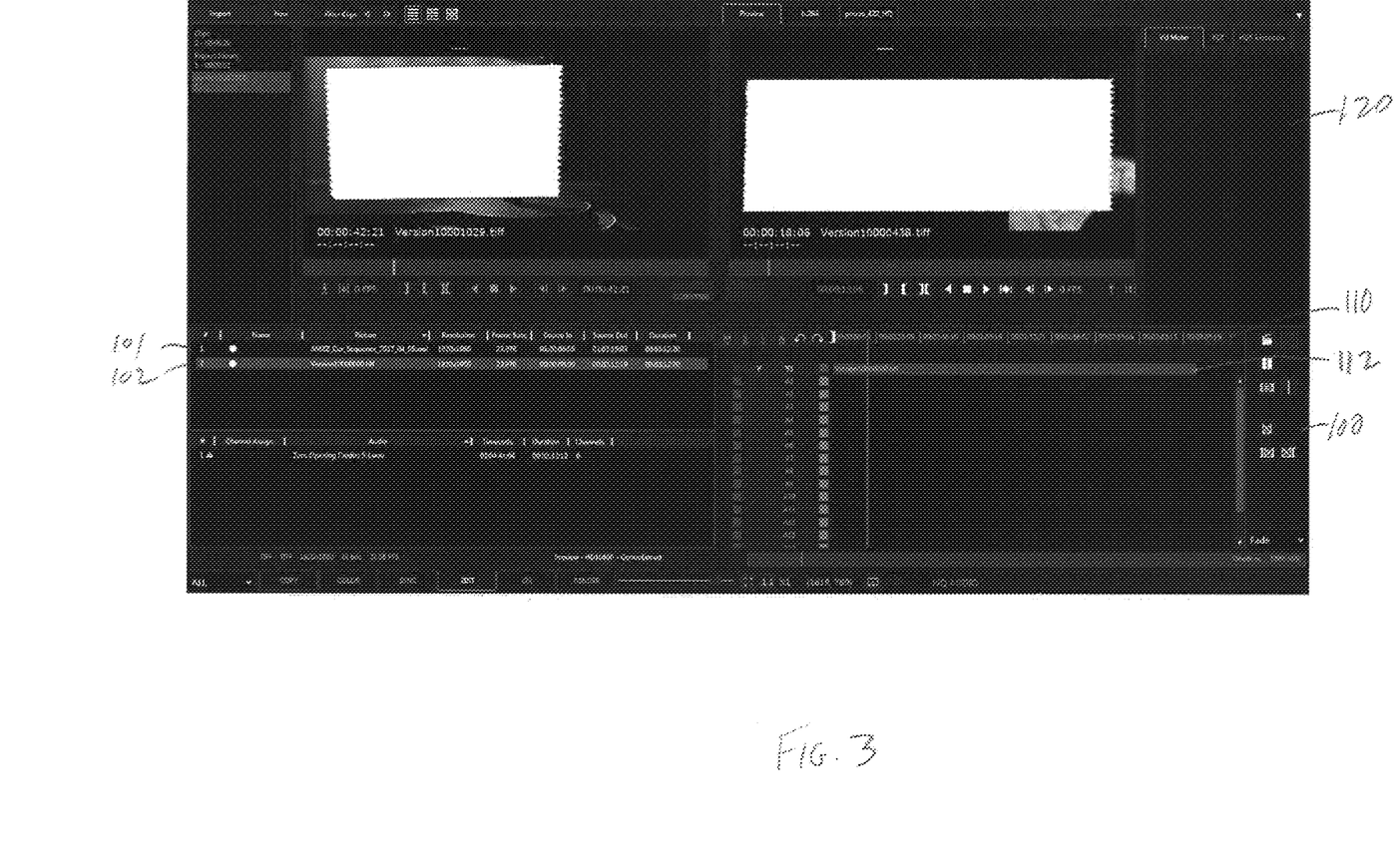
FIG. 3 is a screenshot that demonstrates creation of a composition, in accordance with one exemplary embodiment.

FIG. 3 is a screenshot that demonstrates creation of a composition, in accordance with one exemplary embodiment. A composition is created by associating source files with the composition. Here, two source files are listed in the source control window, specifically, a metadata file entitled AMXZ_Cut_Sequence_2017_04_05.xml (reference numeral 101) and a video file entitled Version10000000.tiff (reference numeral 102). In this example, the composition is created by inserting the Version10000000.tiff video file into track V1 of the composition (reference numeral 112), as represented in the composition control window (reference numeral 100). A representation of the video track for a portion of the composition associated with a given time window is shown (represented by the timestamps 110 displayed above the video track representation 112). In this example, a frame of the video file at time 00:00:18:06 is displayed in the composition view window (reference numeral 120), corresponding to the relative location of the green time reference line displayed in the composition control window 100.

Figure 4:
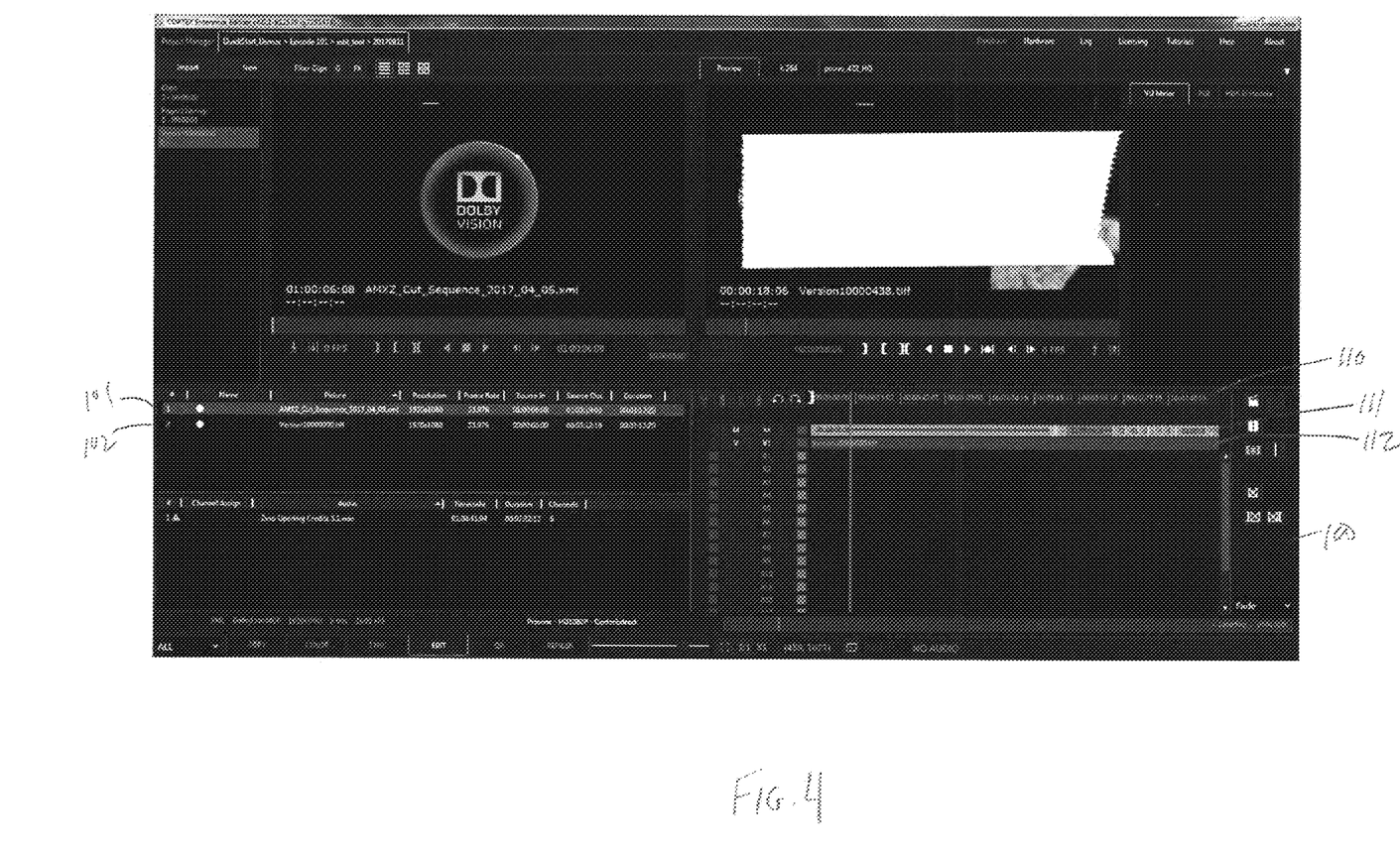
FIG. 4 is a screenshot that demonstrates addition of a metadata track to the composition, in accordance with one exemplary embodiment.

FIG. 4 is a screenshot that demonstrates addition of a metadata track to the composition, in accordance with one exemplary embodiment. Here, a metadata track M is added to the composition and the AMXZ_Cut_Sequence_2017_04_05.xml metadata file from the source control window is inserted into the metadata track M (reference numeral 111), as shown in the composition control window 100.

The metadata editor processes the metadata track to synchronize the metadata track with the video track and identify any errors in the metadata track internally or relative to the video track. The metadata editor effectively divides the metadata track into segments. In an exemplary embodiment, each segment can represent a metadata change, a metadata inconsistency with the corresponding segment of video track, a metadata error (e.g., missing or erroneous timecodes or other values), existence of metadata default values, or an omission in the metadata track, although alternative embodiments can characterize metadata segments in other ways.

As shown in FIG. 4, in an exemplary embodiment, the metadata editor displays breaks (e.g., vertical white lines) on the video and metadata tracks to show the metadata segments relative to the video track. By way of example, a break could delineate where a metadata change occurs, where the metadata track becomes inconsistent with the video track, where an error in the metadata track begins, where default metadata values are being applied, or where metadata is missing.

In an exemplary embodiment, the metadata editor further characterizes each segment as being either erroneous (e.g., warranting attention by the user) or consistent (e.g., not warranting attention by the user) and highlights erroneous metadata segments, e.g., by displaying erroneous metadata segments using a different color, pattern, or other visual indicator than consistent metadata segments. In an exemplary embodiment, erroneous metadata segments include metadata segments that are inconsistent with the corresponding segment of video track, metadata segments that contain an error (e.g., missing or erroneous timecodes or other values), metadata segments that contain or use metadata default values, and metadata segments that represent an omission in the metadata track. While the existence or use of default metadata values in a portion of the metadata track is not necessarily an error, in an exemplary embodiment, the existence or use of default metadata values in a portion of the metadata track is deemed to warrant attention by the user, e.g., so that the user can decide whether to retain or replace the default metadata values. In FIG. 4, an erroneous metadata segment is displayed in purple, while the consistent metadata segments are displayed in blue. It should be noted that multiple colors could be used to highlight erroneous metadata segments, such as, for example, using color to indicate the type of erroneous metadata segment (e.g., one color to indicate a metadata inconsistency with the corresponding segment of video track, a different color to indicate a metadata error, and a different color to indicate a metadata omission), or using different colors where there are multiple successive erroneous metadata segments to make it easier to distinguish erroneous metadata segments.

Figure 5:
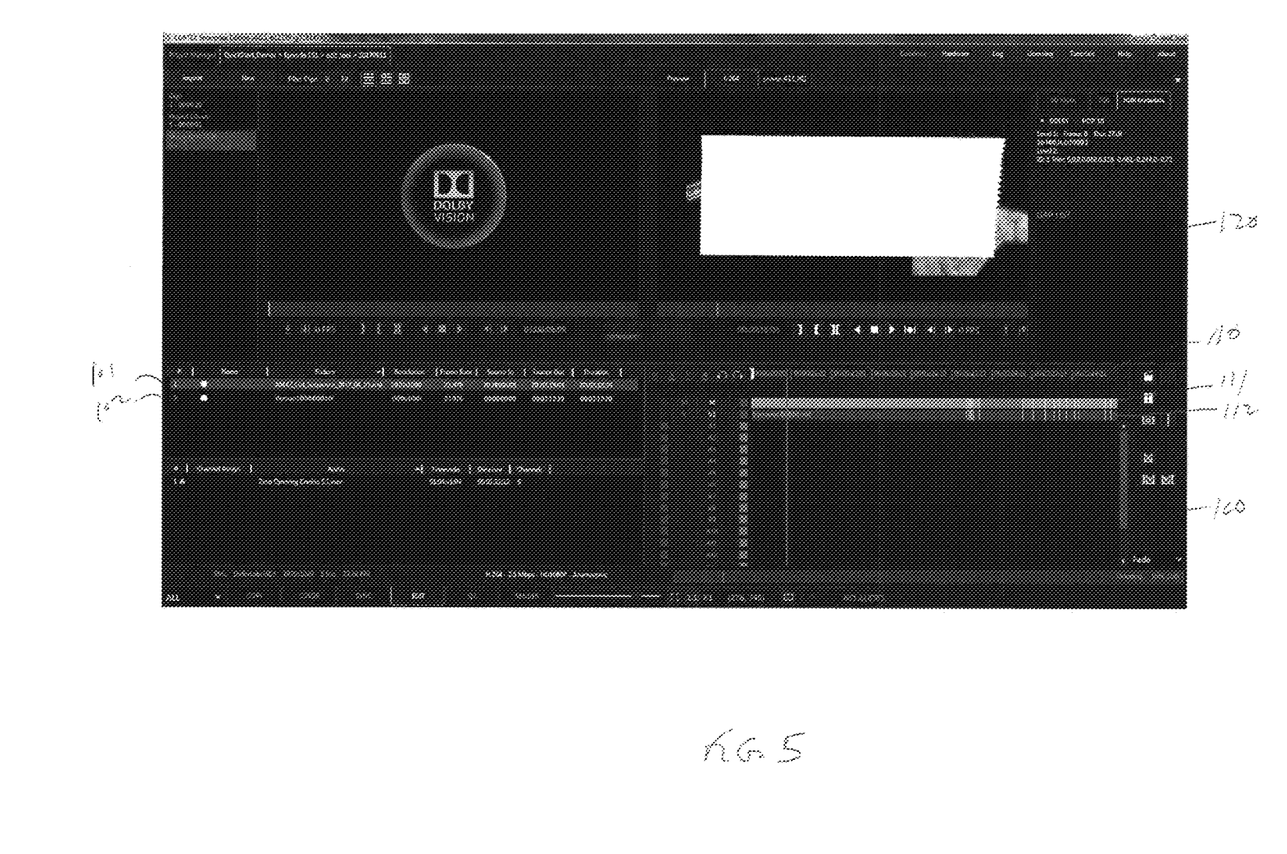
FIG. 5 is a screenshot that demonstrates processing and display of the metadata track, in accordance with one exemplary embodiment.

FIG. 5 is a screenshot that demonstrates processing and display of the metadata track, in accordance with one exemplary embodiment. Here, representations of the metadata and video tracks for a portion of the composition associated with a given time window (represented by the timestamps displayed above the metadata track representation 111) are shown with breaks on both the metadata track and the video track to indicate alignment. The purple segment displayed on the metadata track highlights an error with the metadata track relative to the video track, such as, for example, a metadata segment with Level 1 or Level 2 values of zero.

FIG. 6 is a screenshot showing an updated view of the screen of FIG. 5, showing representations of the video and metadata tracks at a finer granularity (i.e., over a shorter time window as represented by the timestamps displayed above the metadata track representation, with the segments and breaks adjusted accordingly) and with the green time reference line moved up to the beginning of the erroneous metadata segment at time 00:01:59:20. The frame of the video file at time 00:01:59:20 is displayed in the composition view window, corresponding to the relative location of the green time reference line displayed in the composition control window.

With the erroneous metadata segment identified and highlighted, the user can take steps to correct the erroneous metadata segment. Embodiments of the metadata editor can support some or all of the following types of corrective actions:

Fill in missing metadata by extending existing metadata to future frames
Fill in missing metadata by extending existing metadata to previous frames
Fill in missing metadata by copying metadata from another portion of the deliverable media
Fill in missing metadata by copying metadata from other deliverable media
Replace erroneous metadata with correct metadata from other portions of the deliverable media Replace erroneous metadata with correct metadata from other deliverable media Shorten the metadata track, e.g., by trimming the beginning or ending of a shot Lengthen a metadata track, e.g., by extending the beginning or ending of a shot Accept default metadata values A key aspect of the metadata editor is that the representation of the metadata track is not merely a static representation but includes active elements that can be selected and manipulated by the user via the graphical user interface. Specifically, in this example, the erroneous metadata segment highlighted in purple as well as the delineating break on each side of the erroneous metadata segment (as well as other segments and breaks) can be selected and manipulated by the user using drag-and-drop and/or keyboard controls.

Figure 7:
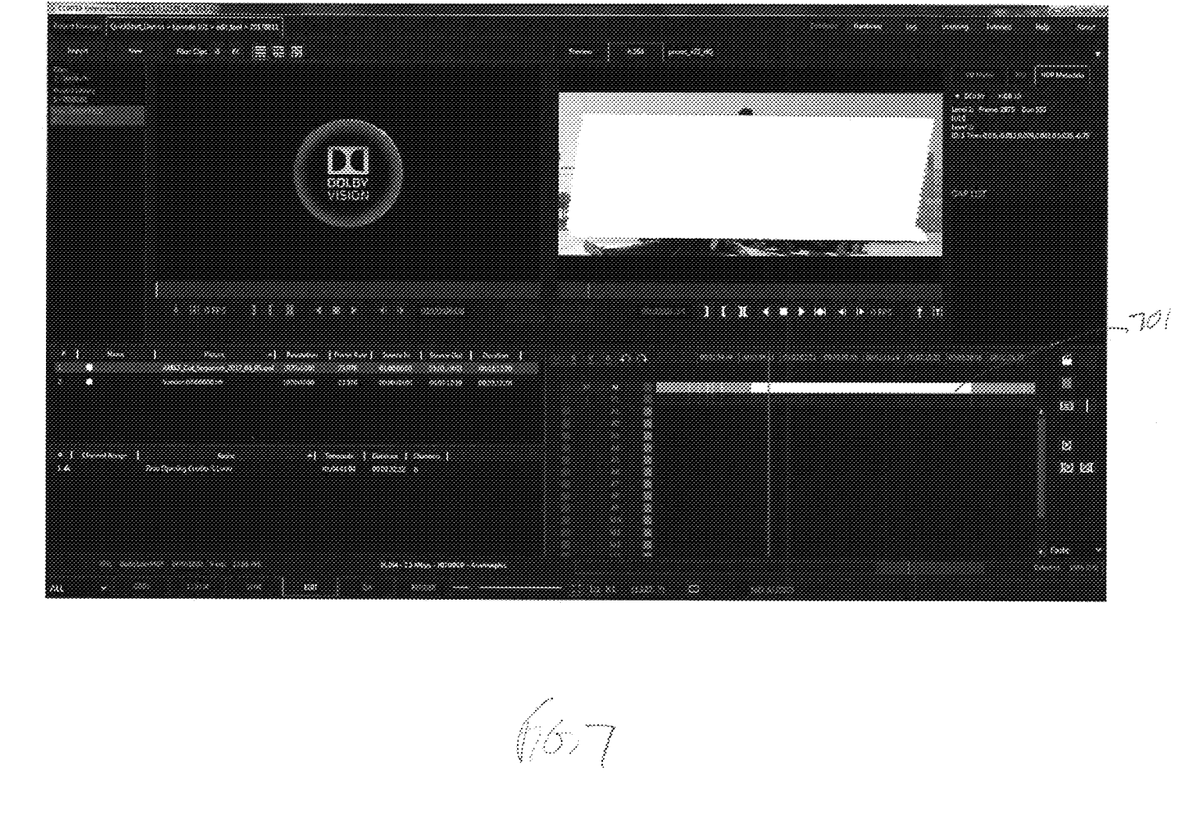
FIG. 7 is a screenshot showing the erroneous metadata segment selected by the user, in accordance with an exemplary embodiment.

One option for the user is to select the erroneous metadata segment and delete it from the metadata track. FIG. 7 is a screenshot showing the erroneous metadata segment selected by the user, in accordance with an exemplary embodiment. In this example, the selected erroneous metadata segment is displayed in white to indicate that it is selected (reference numeral 701). With the erroneous metadata segment selected, the user can then delete the erroneous metadata segment, for example, by dragging it out of the representation of the metadata track or by using the "Delete" key of the keyboard. In an exemplary embodiment, this leaves a gap in the metadata track that then can be filled.

Figure 8:
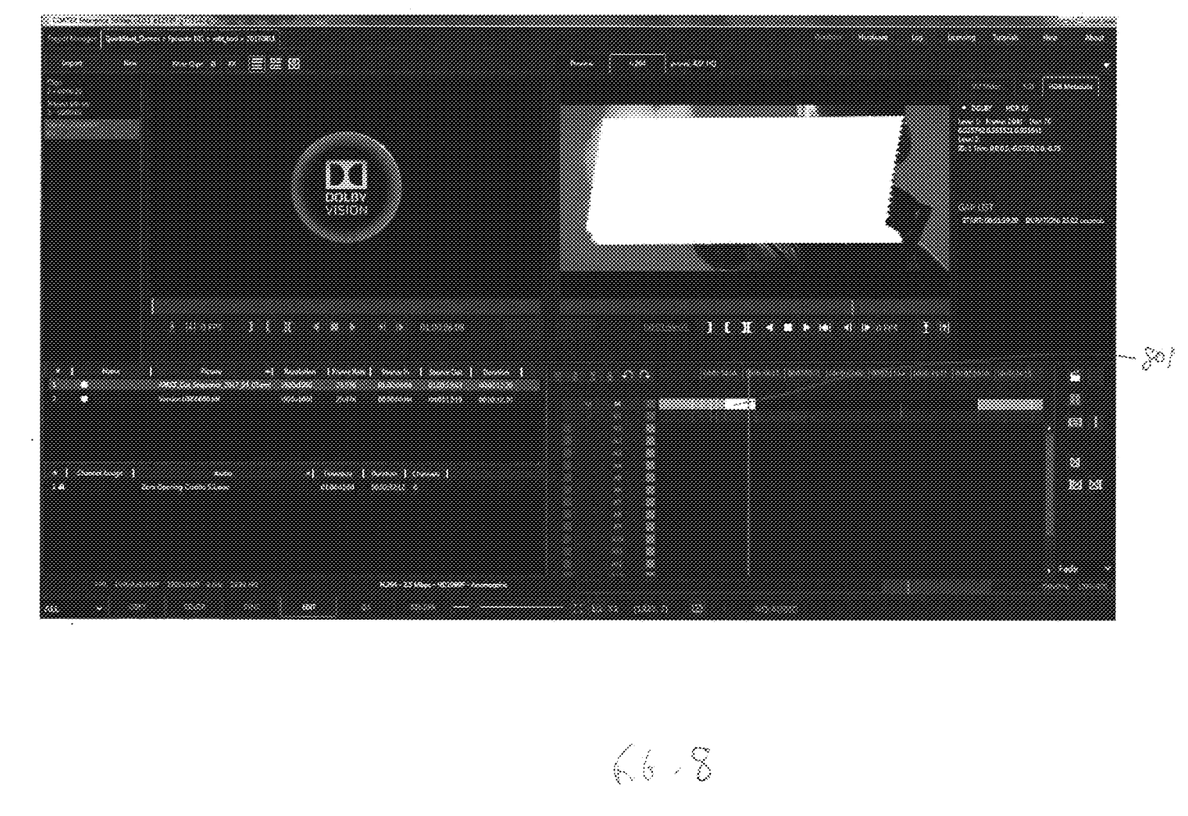
FIG. 8 is a screenshot showing selection of a metadata segment to be copied and pasted into the metadata gap of FIG. 7, in accordance with an exemplary embodiment.

In an exemplary embodiment, one way to fill a metadata gap is to copy another metadata segment from the metadata track or from another source and paste it into the metadata gap. FIG. 8 is a screenshot showing selection of a metadata segment to be copied and pasted into the metadata gap of FIG. 7, in accordance with an exemplary embodiment. In this example, the selected metadata segment is the metadata segment immediately preceding the erroneous/removed metadata segment, and the selected metadata segment is displayed in white to indicate that it is selected (reference numeral 801). Selection of the metadata segment 801 can be accomplished, for example, by dragging the highlighted metadata segment into the metadata gap or by explicitly copying the highlighted metadata segment (e.g., using Ctrl-C) and pasting it into the metadata gap (e.g., using Ctrl-V).

Figure 9:
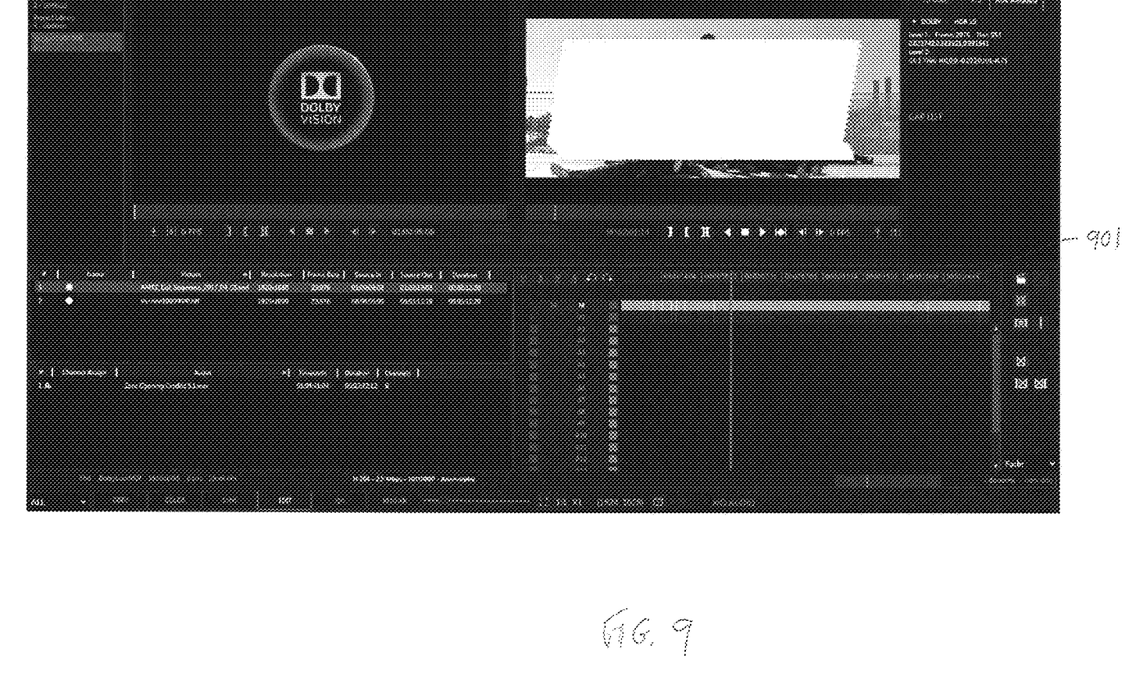
FIG. 9 is a screenshot showing a representation of the metadata track after pasting of the selected metadata segment of FIG. 8, in accordance with an exemplary embodiment.

FIG. 9 is a screenshot showing a representation of the metadata track after pasting of the selected metadata segment of FIG. 8, in accordance with an exemplary embodiment. Here, the pasted metadata segment fills in the prior metadata gap (reference numeral 901), resulting in an update of the metadata track representation to remove the breaks that had previously delineated the erroneous metadata segment and to show that there in longer an erroneous metadata segment (i.e., the metadata segment is now shown in blue rather than purple, and the length of the segment is updated accordingly).

Alternatively, the user may select and drag a break to extend metadata from an earlier or later metadata segment into the erroneous or removed metadata segment. For example, if the user selects the break at the left end of the erroneous or removed metadata segment (i.e., between the erroneous or removed metadata segment and immediately prior metadata segment) and drags it to the right, the metadata editor will extend the metadata from the immediately prior metadata segment. If the user selects the break at the right end of the erroneous or removed metadata segment (i.e., between the erroneous or removed metadata segment and immediately succeeding metadata segment) and drags it to the left, the metadata editor will extend the metadata from the immediately succeeding metadata segment. Conceptually, dragging a break effectively extends the adjacent metadata segment in the drag direction and can be used to fill or replace some or all of an erroneous or removed metadata segment.

Figure 10:
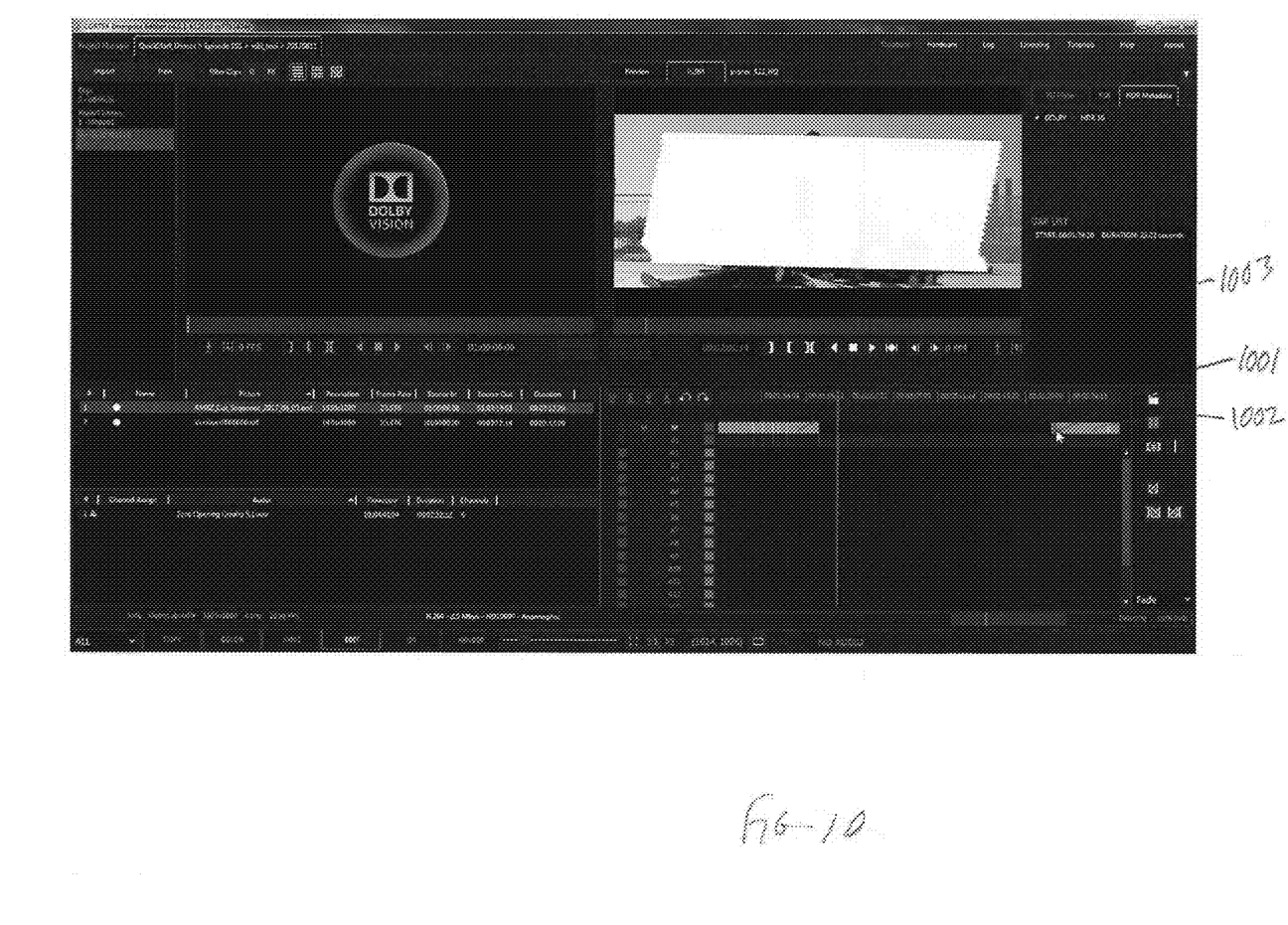
FIG. 10 is a screenshot showing manipulation of the metadata track using the breaks, in accordance with one exemplary embodiment.

FIG. 10 is a screenshot showing manipulation of the metadata track using the breaks, in accordance with one exemplary embodiment. Here, the break at the end of the removed metadata segment (reference numeral 1001) is selected to allow for dragging, in accordance with an exemplary embodiment. For example, the user can drag the highlighted break to the left, in which case the metadata editor will fill in some or all of the metadata gap with the metadata from the immediately succeeding metadata segment (reference numeral 1002), depending on how far the break 1001 is dragged to the left. If the break 1001 is dragged all the way to the other end of the removed metadata segment (i.e., to the immediately preceding metadata segment 1003), then the entire metadata gap will be filled with the metadata from the immediately succeeding metadata segment 1002.

Figure 11:
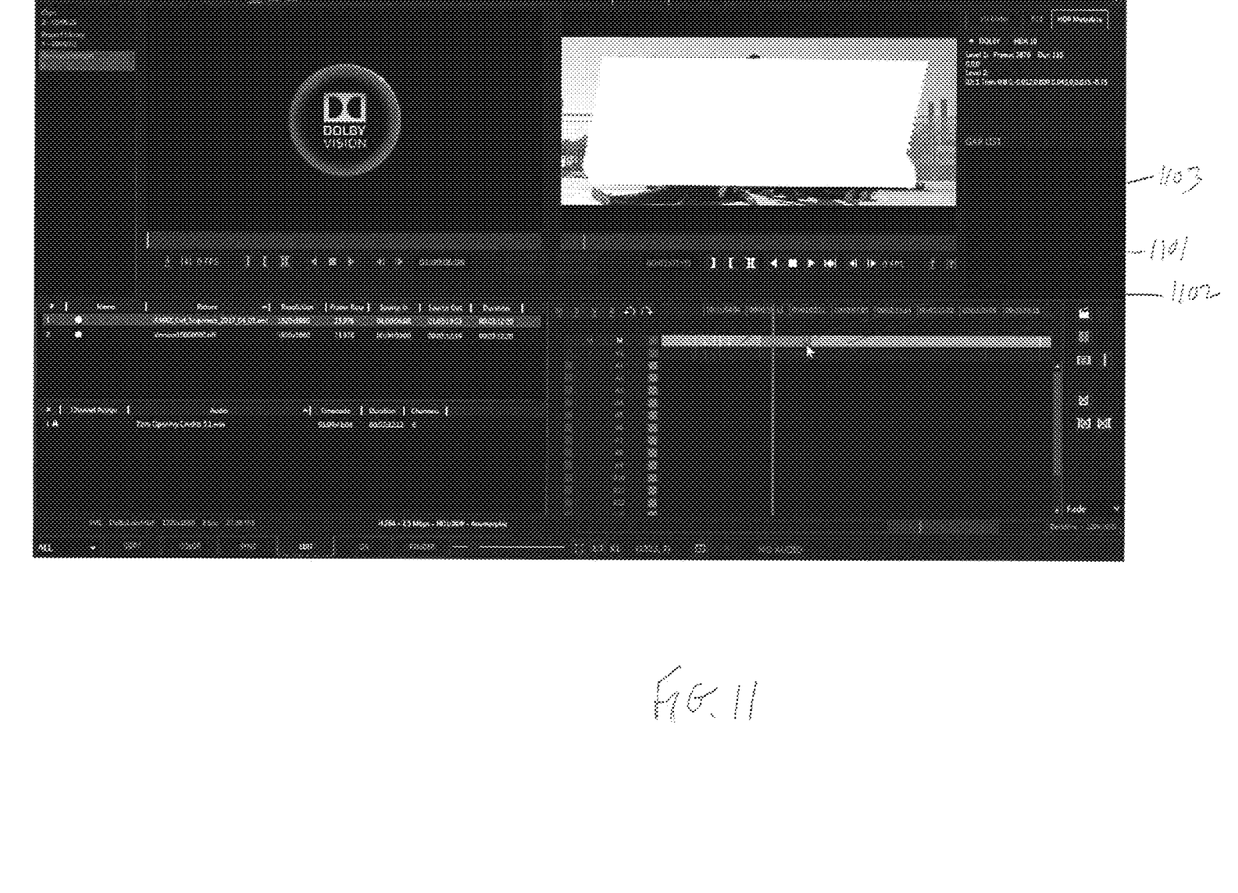
FIG. 11 is a screenshot demonstrating that the manipulation described with reference to FIG. 10 can be done without removing the erroneous metadata segment, in accordance with an exemplary embodiment.

FIG. 11 is a screenshot demonstrating that the manipulation described with reference to FIG. 10 can be done without removing the erroneous metadata segment, in accordance with an exemplary embodiment. Here, the break at the end of the removed metadata segment (reference numeral 1101) is selected to allow for dragging, in accordance with an exemplary embodiment. For example, the user can drag the highlighted break to the left, in which case the metadata editor will fill in some or all of the metadata gap with the metadata from the immediately succeeding metadata segment (reference numeral 1102), depending on how far the break 1101 is dragged to the left. If the break 1101 is dragged all the way to the other end of the removed metadata segment (i.e., to the immediately preceding metadata segment 1103), then the entire metadata gap will be filled with the metadata from the immediately succeeding metadata segment 1102.

Figure 12:
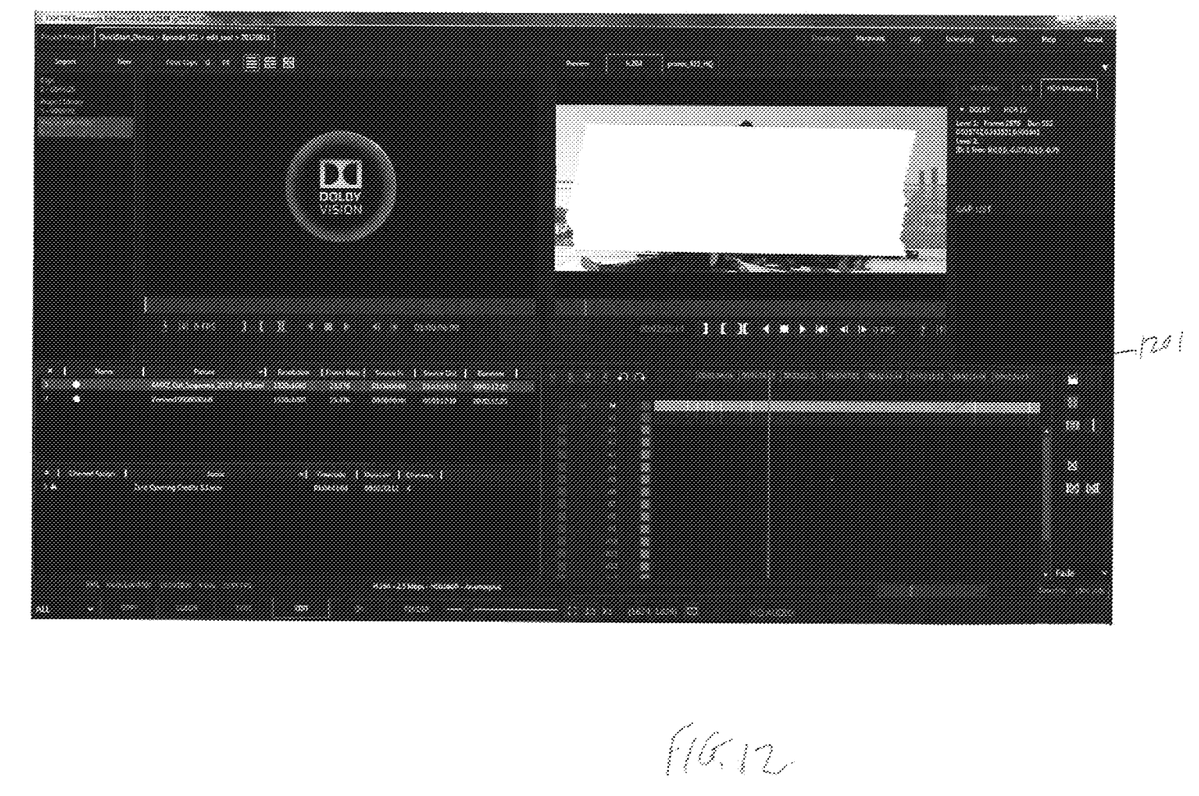
FIG. 12 is a screenshot showing a representation of the metadata track after the manipulation of FIG. 10 or FIG. 11, in accordance with an exemplary embodiment.

FIG. 12 is a screenshot showing a representation of the metadata track after the manipulation of FIG. 10 or FIG. 11, in accordance with an exemplary embodiment. Here, the erroneous or removed metadata segment is filled in with metadata from the immediately succeeding metadata segment (reference numeral 1201), resulting in an update of the metadata track representation to remove the breaks that had previously delineated the erroneous metadata segment and to show that there in longer an erroneous metadata segment (i.e., the metadata segment is now shown in blue rather than purple, and the length of the segment is updated accordingly).

It should be noted that the cut-and-paste and drag-and-drop editing operations can be performed generally on the metadata tracks. For example, the user can drag a break to shorten or extend a metadata segment or to merge two metadata segments. Such manipulation can create a metadata gap where one had not existed, and then the user can fill in the metadata gap as discussed herein.

It also should be noted that an embodiment of the metadata editor can allow the user to accept an erroneous metadata segment (e.g., a metadata segment that contains or uses default metadata values), for example, by presenting the user with an "accept" option when the user selects the erroneous metadata segment (e.g., using a drop-down menu or set of keystrokes). When the user accepts an erroneous metadata segment, the metadata editor may update the metadata track so that the metadata segment is considered to be a consistent metadata segment (e.g., by replacing or marking the metadata segment). The metadata editor then may update the display so that the accepted metadata segment is displayed without highlighting.

It also should be noted that the composition may include multiple metadata tracks, and each metadata track can be independently synchronized to the video track(s), audio track(s), and other metadata track(s) using the manipulations described herein.

The metadata editor can output an edited metadata file, e.g., in XML, format, for use in other compositions.

It is expressly contemplated that the metadata editor can be extended to cover future HDR and other multimedia delivery formats including any variations of existing format. New delivery formats are proposed from time to time, and it is contemplated that the metadata editor will be able to edit metadata for delivery in those formats. In future formats, additional metadata, such as object labeling, object tracking, scene analysis, and any other type of frame-dependent metadata, will require similar editing capabilities. The metadata editor can be extended to edit any type of metadata associated with such multimedia delivery formats, such as for metadata that must remain synchronized to the image and audio media.

It should be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the metadata editor described herein) are necessarily non-conventional because, absent special programming or configuration, the conventional components do not inherently perform the described non-conventional methods.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A computer program product comprising a tangible, non-transitory computer-readable medium having embodied therein a computer program for editing metadata for a multimedia composition having a video track and a metadata track, which, when run on a computer, causes the computer to perform computer processes comprising:
    processing the metadata track to synchronize the metadata track with the video track and to logically divide the metadata track into a succession of metadata segments, wherein each metadata segment is characterized as one of (a) a consistent metadata segment or (b) an erroneous metadata segment; and
    displaying, on a computer display device, a graphical user interface display screen including a representation of a portion of the metadata track including (a) a set of the metadata segments associated with the portion of the metadata track and (b) a break between each pair of adjacent metadata segments, wherein a set of erroneous metadata segments is visually distinguished from a set of consistent metadata segments of the set of metadata segments, and wherein the displayed metadata segments and breaks are active elements that allow for user manipulation of the portion of the metadata track via the graphical user interface display screen to correct the set of erroneous metadata segments.

2. The computer program product of claim 1, wherein the set of consistent metadata segments is displayed using a first visual indicator, and wherein the set of erroneous metadata segments is displayed using at least one visual indicator different than the first color.

3. The computer program product of claim 2, wherein different visual indicators are used to represent different types of erroneous metadata segments.

4. The computer program product of claim 1, wherein the graphical user interface display screen allows the user to delete an erroneous metadata segment.

5. The computer program product of claim 1, wherein the graphical user interface display screen allows the user to replace an erroneous metadata segment by logically copying metadata from another metadata segment and logically pasting the copied metadata to the erroneous metadata segment.

6. The computer program product of claim 1, wherein the graphical user interface display screen allows the user to replace an erroneous metadata segment by logically extending an adjacent metadata segment over the erroneous metadata segment.

7. The computer program product of claim 6, wherein extending an adjacent metadata segment over a portion of the erroneous metadata segment comprises:
    dragging a break associated with the adjacent metadata segment.

8. The computer program product of claim 1, wherein the graphical user interface display screen allows the user to replace an erroneous metadata segment by dragging an adjacent metadata segment to the erroneous metadata segment.

9. The computer program product of claim 1, wherein the graphical user interface display screen allows the user to change the duration of a selected metadata segment.

10. The computer program product of claim 9, wherein changing the duration of a selected metadata segment comprises:
    dragging a break associated with the selected metadata segment.

11. The computer program product of claim 1, wherein the graphical user interface display screen allows the user to accept an erroneous metadata segment.

12. A computer-implemented method for editing metadata for a multimedia composition having a video track and a metadata track, the method comprising:
    processing the metadata track to synchronize the metadata track with the video track and to logically divide the metadata track into a succession of metadata segments, wherein each metadata segment is characterized as one of (a) a consistent metadata segment or (b) an erroneous metadata segment; and
    displaying, on a computer display device, a graphical user interface display screen including a representation of a portion of the metadata track including (a) a set of the metadata segments associated with the portion of the metadata track and (b) a break between each pair of adjacent metadata segments, wherein a set of erroneous metadata segments is visually distinguished from a set of consistent metadata segments of the set of metadata segments, and wherein the displayed metadata segments and breaks are active elements that allow for user manipulation of the portion of the metadata track via the graphical user interface display screen to correct the set of erroneous metadata segments.

13. The method of claim 12, wherein the set of consistent metadata segments is displayed using a first visual indicator, and wherein the set of erroneous metadata segments is displayed using at least one visual indicator different than the first color.

14. The method of claim 13, wherein different visual indicators are used to represent different types of erroneous metadata segments.

15. The method of claim 12, wherein the graphical user interface display screen allows the user to delete an erroneous metadata segment.

16. The method of claim 12, wherein the graphical user interface display screen allows the user to replace an erroneous metadata segment by logically copying metadata from another metadata segment and logically pasting the copied metadata to the erroneous metadata segment.

17. The method of claim 12, wherein the graphical user interface display screen allows the user to replace an erroneous metadata segment by logically extending an adjacent metadata segment over the erroneous metadata segment.

18. The method of claim 17, wherein extending an adjacent metadata segment over a portion of the erroneous metadata segment comprises:
 dragging a break associated with the adjacent metadata segment.

19. The method of claim 12, wherein the graphical user interface display screen allows the user to replace an erroneous metadata segment by dragging an adjacent metadata segment to the erroneous metadata segment.

20. The method of claim 12, wherein the graphical user interface display screen allows the user to change the duration of a selected metadata segment.

21. The method of claim 20, wherein changing the duration of a selected metadata segment comprises:
 dragging a break associated with the selected metadata segment.

22. The method of claim 12, wherein the graphical user interface display screen allows the user to accept an erroneous metadata segment.

\* \* \* \* \*